US009721401B2

(12) United States Patent
Raeder et al.

(10) Patent No.: US 9,721,401 B2
(45) Date of Patent: Aug. 1, 2017

(54) COMMUNICATION SYSTEM AND METHOD FOR A RAIL VEHICLE CONSIST

(71) Applicant: Electro-Motive Diesel, Inc., LaGrange, IL (US)

(72) Inventors: Benjamin Arthur Raeder, Mount Prospect, IL (US); Dennis Melas, Chicago, IL (US); Daniel E. Bechtlofft, Lemont, IL (US); Wayne Allen Rudolph, Lemont, IL (US); Mark Alan Fanara, Blue Springs, MO (US); Andrew Joseph Shakal, Bloomer, WI (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/599,668

(22) Filed: Jan. 19, 2015

(65) Prior Publication Data

US 2016/0207550 A1 Jul. 21, 2016

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |
| ***G07C 5/08*** | (2006.01) |
| ***B61C 17/12*** | (2006.01) |
| ***B61L 15/00*** | (2006.01) |
| ***B61L 3/00*** | (2006.01) |

(52) U.S. Cl.
CPC ............ *G07C 5/0816* (2013.01); *B61C 17/12* (2013.01); *B61L 3/006* (2013.01); *B61L 15/009* (2013.01); *B61L 15/0072* (2013.01); *B61L 15/0081* (2013.01); *G07C 5/0825* (2013.01)

(58) Field of Classification Search
None
See application file for complete search history.

(56) References Cited

U.S. PATENT DOCUMENTS

| | | | | |
|---|---|---|---|---|
| 5,836,529 A | | 11/1998 | Gibbs | |
| 7,618,011 B2 | | 11/2009 | Oleski et al. | |
| 8,655,517 B2 | | 2/2014 | Brand et al. | |
| 2010/0318247 A1 | * | 12/2010 | Kumar | B61L 3/006 701/20 |
| 2013/0171590 A1 | * | 7/2013 | Kumar | B61L 3/006 434/62 |
| 2014/0277862 A1 | * | 9/2014 | Pritchard | B61C 17/12 701/19 |

* cited by examiner

*Primary Examiner* — Lail Kleinman
(74) *Attorney, Agent, or Firm* — Miller, Matthias & Hull

(57) ABSTRACT

A rail vehicle consist may include a master unit and at least one trailing unit coupled to the master unit. The master unit may include a first processor in communication with a second processor of the at least one trailing unit. A power source may be disposed on the at least one trailing unit and may include a sensor associated with the second processor. A display may be disposed on the master unit and may be associated with the first processor to display characteristics monitored by the sensor wherein the display presents a message image, a warning image, and an isolate image.

19 Claims, 4 Drawing Sheets

COMMUNICATION SYSTEM AND METHOD FOR A RAIL VEHICLE CONSIST

TECHNICAL FIELD

The present disclosure relates generally to rail vehicle consists and, more particularly, to interconsist communications for such rail vehicle consists.

BACKGROUND

A rail vehicle consist generally includes two or more rail vehicles that are mechanically coupled together to travel along a set of rails. A train is one example of such a rail vehicle consist. Typically, the train may include one or more powered rail car, such as a locomotive, and one or more non-powered rail car. In general, the rail vehicle consist may include a master or lead locomotive, one or more trailing locomotives linked behind the master locomotive, and one or more non-powered rail cars linked behind the one or more trailing locomotive. The master locomotive and the one or more trailing locomotives may communicate with each other via a communication link. For example, a train line, such as a wire harness, may interconnect each of the locomotives of the rail vehicle consist.

In certain rail vehicle consists, the master locomotive and the one or more trailing locomotives may each be powered by a diesel engine. In most diesel locomotive engines, the fuel itself is used as a lubricant for the engine fuel injector. Accordingly, problems may arise when the locomotive fuel level starts to become critically low because the engine fuel injector will not be properly lubricated. Moreover, if a diesel locomotive engine runs completely out of fuel significan damage may be caused to the engine.

U.S. Pat. No. 7,618,011 (the '011 patent) discloses a consist manager for controlling a consist having a lead locomotive and at least one trailing locomotive. While the '011 patent teaches the consist manager controlling the locomotives and teaches a graphical user interface allowing a user to selectively identify characteristics of the locomotives in the consist, it fails to teach the monitoring and controlling of the locomotives based on a warning determined from the identified characteristics of the locomotives.

SUMMARY

In accordance with an aspect of the disclosure, a rail vehicle consist is provided. The rail vehicle consist may include a master unit and at least one trailing unit coupled to the master unit. The master unit may include a first processor in communication with a second processor of the at least one trailing unit. A power source may be disposed on the at least one trailing unit and may include a sensor associated with the second processor. A display may be disposed on the master unit and may be associated with the first processor to display characteristics monitored by the sensor wherein the display presents a message image, a warning image, and an isolate image.

In accordance with another aspect of the disclosure, a method for preventing damage to a power source of at least one trailing unit in a rail vehicle consist is provided. The method may include monitoring fuel level of the power source via a sensor using a first processor. The first processor may be disposed on the at least one trailing unit. The method may include communicating a low fuel signal to a second processor when the sensor monitors a low fuel level using the first processor. The second processor may be disposed on a master unit coupled to the at least one trailing unit. The method may include displaying a warning image, a message image, and an isolate image on a display via a graphical user interface using the second processor. The method may include selecting the isolate image to communicate an isolate signal to the first processor using the second processor. The method may include isolating the at least one trailing unit using the first processor.

In accordance with yet another aspect of the disclosure, a non-transitory, computer readable medium having thereon computer-executable instructions for preventing damage to a power source of at least one trailing unit in a rail vehicle consist is provided. The instructions may include instructions for monitoring fuel level of the power source via a sensor using a first processor. The first processor may be disposed on the at least one trailing unit. The instructions may include instructions for communicating a low fuel signal to a second processor when the sensor monitors a low fuel level using the first processor. The second processor may be disposed on a master unit coupled to the at least one trailing unit. The instructions may include instructions for displaying a warning image, a message image, and an isolate image on a display via a graphical user interface using the second processor. The instructions may include instructions for selecting the isolate image to communicate an isolate signal to the first processor using the second processor. The instructions may include instructions for isolating the at least one trailing unit using the first processor.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

The present disclosure provides systems and methods for identifying and monitoring the fuel level of at least one trailing unit in a rail vehicle consist and sending the fuel level of the at least one trailing unit to the master unit of the consist via interconsist communication. Such systems and methods may also warn an operator of the rail vehicle consist through a graphical user interface when the fuel level on the at least one trailing unit passes a threshold that indicates critically low levels of fuel and provide the operator with an option to isolate the at least one trailing unit to prevent damage thereto. Such a communication system may warn against conditions other than low fuel as well.

Figure 1:
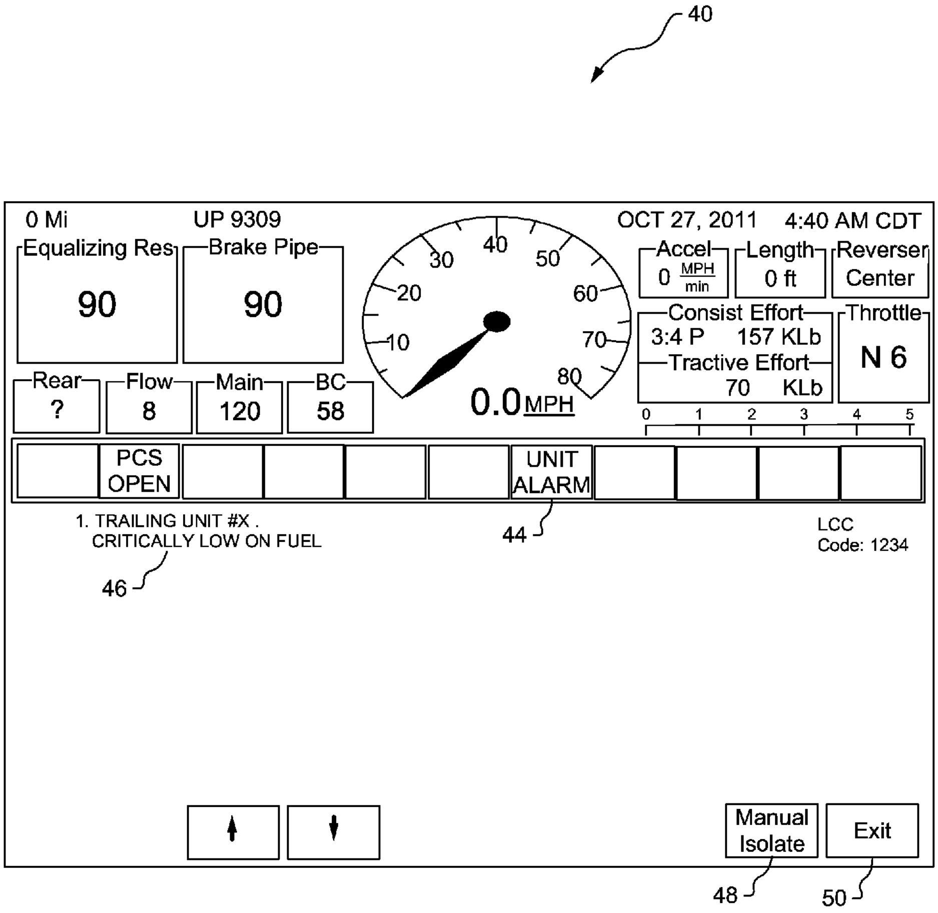
FIG. 1 is a schematic diagram of an exemplary system in accordance with the teachings of the present disclosure.

Referring now to FIG. 1, an exemplary system for preventing engine damage on at least one trailing unit in a rail vehicle consist constructed in accordance with the present disclosure is generally referred to by reference numeral 10. The system 10 may include any type of rail vehicle consist such as, but not limited to, a locomotive consist or a train. As such, the system 10 may include a master unit or locomotive 12 and at least one trailing unit or locomotive 14. The at least one trailing locomotive 14 may be mechanically coupled to the master locomotive 12. Although the master locomotive 12 may be the lead or first locomotive in the system 10, it is understood that the master locomotive 12 may be generally described as the locomotive within the system 10 in which an operator may ride and may be located in various positions relative to the at least one trailing locomotive 14 such that the at least one trailing locomotive 14 may be located before the master locomotive 12 in the direction of travel of the rail vehicle consist.

The master locomotive 12 may include a first locomotive control 16, a first interconsist communication 18, and a first power source 20. Similarly, the at least one trailing locomotive 14 may include a second locomotive control 22, a second interconsist communication 24, and a second power source 26. As a non-limiting example, the first and second locomotive controls 16, 22 may be a processor. The first and second interconsist communications 18, 24 may be, but not limited to, a smart interconsist communication (ICC). The first and second power sources 20, 26 may be, but not limited to, a diesel engine.

The master locomotive 12 and the at least one trailing locomotive 14 may also be in communication via a communication link 28, which may be any wired or wireless link. As an example of a wired link, the communication link 28 may include a multiple unit (MU) jumper cable 30 coupling the master locomotive 12 to the at least one trailing locomotive 14. One end of the MU jumper cable 30 may be coupled to the first interconsist communication 18 via first train line wires 32 while the other end of the MU jumper cable 30 may be coupled to the second interconsist communication 24 via second train line wires 34 so that the first locomotive control 16 may communicate with the second locomotive control 22. The first interconsist communication 18 may be coupled to the first locomotive control 16 and the second interconsist communication 24 may be coupled to the second locomotive control 22. In a rail vehicle consist with more than one at least one trailing locomotive, a locomotive control on each respective trailing locomotive may communicate with the first locomotive control 16.

The first locomotive control 16 may communicate with a first sensor 36 associated with the first power source 20 and may also communicate, via the second locomotive control 22, with a second sensor 38 associated with the second power source 26. The first and second sensors 36, 38 may measure one or more operating characteristics of the master locomotive 12 and at least one trailing locomotive 14, respectively. As an example, the first and second sensors 36, 38 may sense characteristics such as, but not limited to, fuel level. The first and second sensors 36, 38, may then provide the characteristics to the first locomotive control 16. The first locomotive control 16 may receive the characteristics and present a graphical user interface (GUI) 40 via a display 42.

Figure 2:
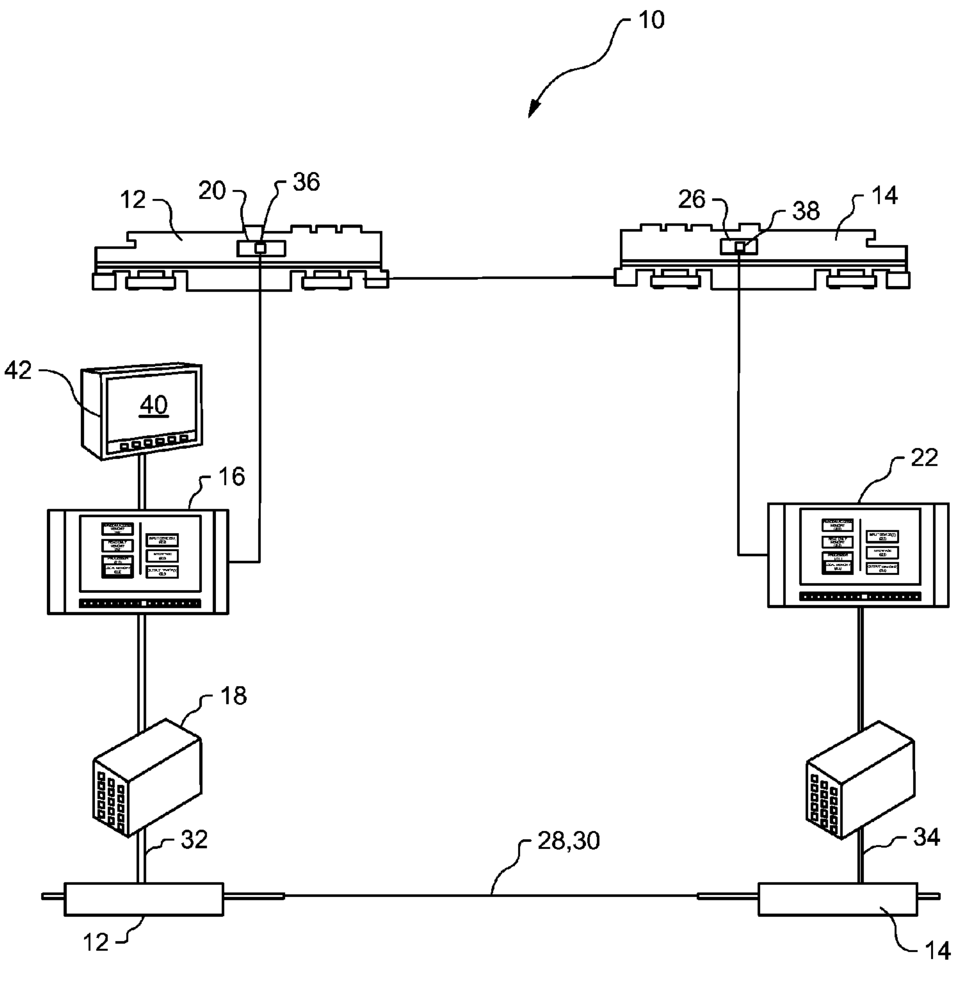
FIG. 2 is an exemplary graphical user interface display in accordance with the teachings of the present disclosure.

Referring to FIG. 2, the GUI 40 may simultaneously display a warning image 44 and a crew message image 46 when the second sensor 38 senses the fuel level of the second power source 26 passing below a threshold level of low fuel. In a rail vehicle consist with more than one at least one trailing locomotive, the crew message image 46 may indicate by number, name, or other designation which of the trailing locomotives has fuel levels that passed below the threshold level. Moreover, the GUI 40 may also display an isolate image 48, which an operator may select to isolate the at least one trailing locomotive 14 associated with the particular crew message image 46. The GUI 40 may also display an exit image 50, which an operator may select to clear the crew message image 46.

Figure 3:
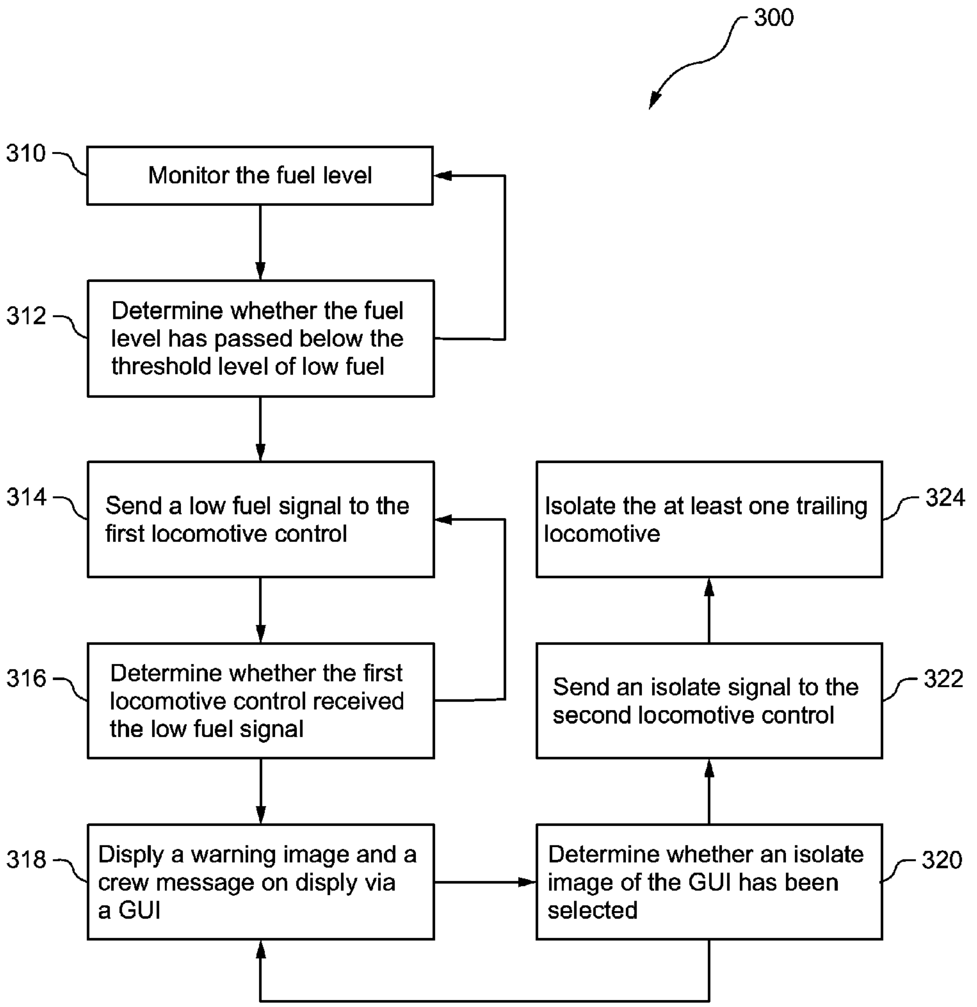
FIG. 3 is a flow chart illustrating a sample sequence of steps which may be practiced in accordance with the teaching of the present disclosure.

FIG. 3 illustrates a flowchart 300 of a sample sequence of steps which may be performed to prevent engine damage on at least one trailing unit in a rail vehicle consist using the system 10. As such, like reference numerals are used when describing elements of system 10 as they relate to flowchart 300.

Starting at box 310, the second sensor 38 may monitor the fuel level of the second power source 26 of the at least one trailing locomotive 14. Box 312 illustrates determining whether the fuel level of the second power source 26 has passed below the threshold level of low fuel. If the fuel level is above the threshold, the second sensor 38 may continue monitoring the fuel level. If the fuel level is below the threshold, the second locomotive control 22 may send a low fuel signal to the first locomotive control 16 to indicate the second power source 26 has a fuel level below the threshold level, as depicted in box 314. Box 316 illustrates determining whether the first locomotive control 16 has received the low fuel signal. If the first locomotive control 16 did not receive the low fuel signal, the low fuel signal is resent. If the first locomotive control 16 received the low fuel signal, the warning image 44 and the crew message image 46 are displayed on the display 42 via the GUI 40 indicating that the second power source 26 has low fuel, as depicted in box 318.

Box 320 illustrates determining whether an operator has selected the isolate image 48 to request to isolate the at least one trailing locomotive 14. If the operator has not selected the isolate image 48, the warning image 44 and the crew message image 46 will remain displayed on the display 42 via the GUI 40. If the operator has selected the isolate image 48, the first locomotive control 16 sends an isolate signal to the second locomotive control 22, as depicted in box 322. Box 324 illustrates the second locomotive control 22 isolating the at least one trailing locomotive 14.

Figure 4:
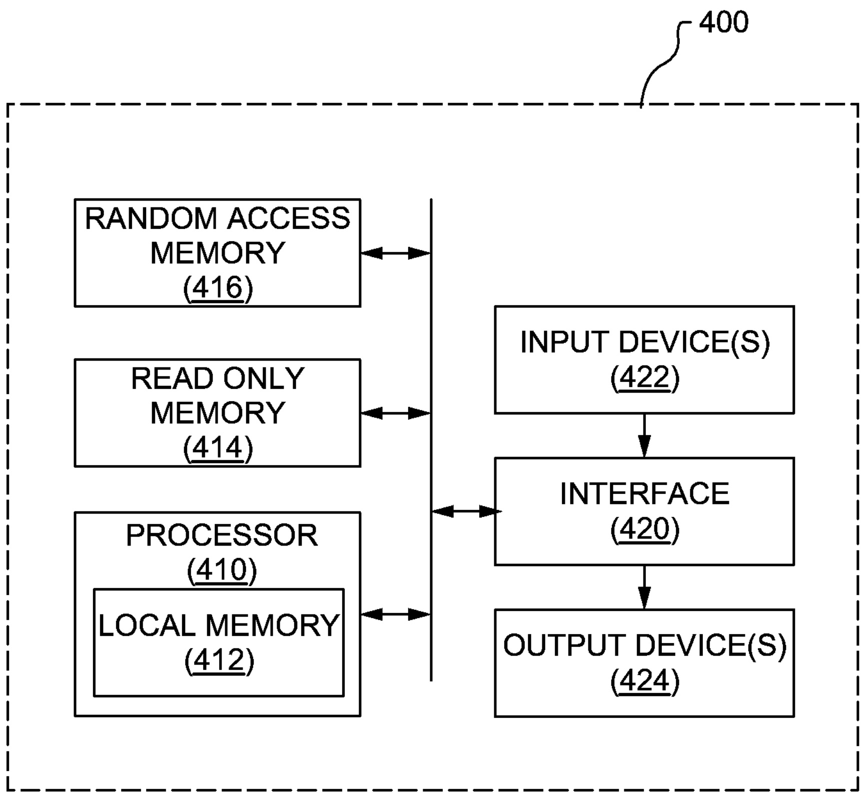
FIG. 4 is a schematic diagram for an example computer that may execute instructions for providing the example systems and methods of the present disclosure.

FIG. 4 is a block diagram of an example computer 400 capable of executing the systems and methods of the present disclosure. The computer 400 can be, for example, a server, a personal computer, or any other type of computing device.

The computer 400 of the instant example includes a processor 410. For example, the processor 410 can be implemented by one or more microprocessors or controllers from any desired family or manufacturer.

The processor 410 includes a local memory 412 and is in communication with a main memory including a read only memory 414 and a random access memory 416 via a bus 418. The random access memory 416 may be implemented by Synchronous Dynamic Random Access Memory (SDRAM), Dynamic Random Access Memory (DRAM), RAMBUS Dynamic Random Access Memory (RDRM) and/or any other type of random access memory device. The read only memory 414 may be implemented by a hard drive, flash memory and/or any other desired type of memory device.

The computer 400 also includes an interface circuit 420. The interface circuit 420 may be implemented by any type of interface standard, such as, for example, an Ethernet interface, a universal serial bus (USB), and/or a PCI express interface. One or more input devices 422 are connected to the interface circuit 420. The input device(s) 422 permit a user to enter data and commands into the processor 410. The input device(s) can be implemented by, for example, a keyboard, a mouse, a touchscreen, a track-pad, a trackball, isopoint and/or a voice recognition system.

One or more output devices 424 are also connected to the interface circuit 420. The output devices 424 can be implemented by, for example, display devices for associated data (e.g., a liquid crystal display, a cathode ray tube display (CRT), etc.). The output device may display the GUI 40 such that a user may use the input device(s) 422 to interact with the GUI 40 to, for example, selectively isolate the at least one trailing locomotive 14.

The computer 400 may be used to execute machine readable instructions. For example, the computer 400 may execute machine readable instructions to perform the sample sequence of steps illustrated in flowchart 300 of FIG. 3. In such examples, the machine readable instructions comprise a program for execution by a processor such as the processor 410 shown in the example computer 400. The program may be embodied in software stored on a tangible non-transitory computer readable medium such as a CD-ROM, a floppy disk, a hard drive, a digital versatile disk (DVD), a Blu-ray disk, or a memory associated with the processor 410, but the entire program and/or parts thereof could alternatively be executed by a device other than the processor 410 and/or embodied in firmware or dedicated hardware. Further, although the example programs are described with reference to the flowchart 300 illustrated in FIG. 3, many other methods of implementing embodiments of the present disclosure may alternatively be used. For example, the order of execution of the blocks may be changed, and/or some of the blocks described may be changed, eliminated, or combined.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth systems and methods for preventing engine damage on at least one trailing unit in a rail vehicle consist. For example, during operation of system 10, an operator may ride in the master locomotive 12 to operate the system 10. The second sensor 38 monitors the fuel level of the second power source 36 of the at least one trailing locomotive 14. When the fuel level of the second power source 36 falls below a threshold level of low fuel, a warning image 44 and a crew message image 46 are displayed on the display 42 via GUI 40. The threshold level of low fuel may be an amount of fuel that is sufficient to operationally maintain lubrication of components of the second power source 36 such as, but not limited to, fuel injectors. The GUI 40 also displays an isolate image 48, which the operator may select to isolate the at least one trailing locomotive 14.

As exemplified and described above, the teachings of this disclosure may be employed to allow an operator in a master locomotive to selectively isolate at least one trailing locomotive when the fuel level of the second power source on the at least one trailing locomotive passes a threshold level of low fuel. Moreover, through the novel teachings set forth above, damage may be prevented to the second power source by isolating the at least one trailing locomotive before the fuel level is below a level that is insufficient to properly lubricate fuel injectors of the second power source. Using the systems and methods described above an operator, all from within the master locomotive, may be warned and prevent engine damage on at least one trailing locomotive.

What is claimed is:

1. A rail vehicle consist, the consist comprising:
- a master unit including a first processor;
- at least one trailing unit coupled to the master unit, the at least one trailing unit including a second processor in communication with the first processor;
- a power source disposed on the at least one trailing unit, the power source including a sensor associated with the second processor; and
- a display disposed on the master unit, the display associated with the first processor to simultaneously display a warning image and a message image associated with characteristics monitored by the sensor and an isolate image associated with the message image and configured to isolate the at least one trailing unit.

2. The consist of claim 1, wherein the first processor is coupled to the second processor via a multiple unit jumper cable.

3. The consist of claim 2, further including a first interconsist communication coupling the first processor to the multiple unit jumper cable and a second interconsist communication coupling the second processor to the multiple unit jumper cable.

4. The consist of claim 3, wherein first train line wires couple the first interconsist communication to the multiple unit jumper cable and second train line wires couple the second interconsist communication to the multiple unit jumper cable.

5. The consist of claim 1, wherein selection of the isolate image isolates the at least one trailing unit.

6. The consist of claim 1, wherein the power source is a diesel engine.

7. The consist of claim 1, wherein the message image indicates the at least one trailing unit by one of number and name.

8. The consist of claim 1, wherein the master unit and the at least one trailing unit are locomotives.

9. A method for preventing damage to a power source of at least one trailing unit in a rail vehicle consist, the method comprising:
- monitoring fuel level of the power source via a sensor using a first processor, the first processor disposed on the at least one trailing unit;
- communicating a low fuel signal to a second processor when the sensor monitors a low fuel level using the first processor, the second processor disposed on a master unit coupled to the at least one trailing unit;
- displaying a warning image, a message image associated with the low fuel level monitored by the sensor, and an isolate image associated with the message image on a display via a graphical user interface using the second processor, wherein the warning image and the message image are simultaneously displayed on the display;

selecting the isolate image to communicate an isolate signal to the first processor using the second processor; and isolating the at least one trailing unit using the first processor.

10. The method of claim 9, wherein the step of monitoring fuel level of the power source further includes determining whether the fuel level has passed below a threshold level of low fuel.

11. The method of claim 9, wherein the step of communicating a low fuel signal to a second processor further includes determining whether the second processor received the low fuel signal.

12. The method of claim 9, wherein the step of selecting the isolate image further includes determining whether the first processor received the isolate signal.

13. The method of claim 9, wherein the power source is a diesel engine.

14. The method of claim 9, wherein the first processor and the second processor communicate via a multiple unit jumper cable.

15. The method of claim 9, wherein the master unit and the at least one trailing unit are locomotives.

16. A non-transitory, computer readable medium having thereon computer-executable instructions for preventing damage to a power source of at least one trailing unit in a rail vehicle consist, the instructions comprising:

instructions for monitoring fuel level of the power source via a sensor using a first processor, the first processor disposed on the at least one trailing unit;

instructions for communicating a low fuel signal to a second processor when the sensor monitors a low fuel level using the first processor, the second processor disposed on a master unit coupled to the at least one trailing unit;

instructions for displaying a warning image, a message image associated with the low fuel level monitored by the sensor, and an isolate image associated with the message image on a display via a graphical user interface using the second processor, wherein the warning image and the message image are simultaneously displayed on the display;

instructions for selecting the isolate image to communicate an isolate signal to the first processor using the second processor; and instructions for isolating the at least one trailing unit using the first processor.

17. The non-transitory, computer readable medium having thereon computer-executable instructions of claim 16, wherein the instructions for monitoring fuel level of the power source further includes instructions for determining whether the fuel level has passed below a threshold level of low fuel.

18. The non-transitory, computer readable medium having thereon computer-executable instructions of claim 16, wherein the instructions for communicating a low fuel signal to a second processor further includes instructions for determining whether the second processor received the low fuel signal.

19. The non-transitory, computer readable medium having thereon computer-executable instructions of claim 16, wherein the instructions for selecting the isolate image further includes instructions for determining whether the first processor received the isolate signal.

* * * * *